United States Patent
Pace et al.

(10) Patent No.: US 9,379,584 B2
(45) Date of Patent: Jun. 28, 2016

(54) LOW INERTIA DIRECT DRIVE DRAWWORKS

(71) Applicant: CANRIG DRILLING TECHNOLOGY LTD., Houston, TX (US)

(72) Inventors: Gary Pace, Cypress, TX (US); Kevin R. Williams, Cypress, TX (US); James Garaghty, Houston, TX (US); Brian Ellis, Houston, TX (US)

(73) Assignee: CANRIG DRILLING TECHNOLOGY LTD., Houston, TX (US)

( * ) Notice: Subject to any disclaimer, the term of this patent is extended or adjusted under 35 U.S.C. 154(b) by 0 days.

(21) Appl. No.: 14/656,866

(22) Filed: Mar. 13, 2015

(65) Prior Publication Data

US 2015/0263575 A1   Sep. 17, 2015

Related U.S. Application Data

(60) Provisional application No. 61/952,478, filed on Mar. 13, 2014.

(51) Int. Cl.

| | |
|---|---|
| *E21B 19/00* | (2006.01) |
| *E21B 19/09* | (2006.01) |
| *H02K 1/30* | (2006.01) |
| *B66D 1/12* | (2006.01) |
| *H02K 1/27* | (2006.01) |
| *H02K 1/32* | (2006.01) |

(52) U.S. Cl.
CPC .. *H02K 1/30* (2013.01); *B66D 1/12* (2013.01); *E21B 19/008* (2013.01); *E21B 19/09* (2013.01); *H02K 1/278* (2013.01); *H02K 1/32* (2013.01)

(58) Field of Classification Search
CPC ... E21B 19/006; E21B 19/084; E21B 19/008; E21B 19/09; H02K 1/30; H02K 1/2706; H02K 1/278
USPC .......................................................... 166/355
See application file for complete search history.

(56) References Cited

U.S. PATENT DOCUMENTS

| | | | |
|---|---|---|---|
| 2,709,284 A | 5/1955 | Evans et al. | |
| 3,231,803 A | 1/1966 | Pryor et al. | |
| 3,653,636 A * | 4/1972 | Burrell | E21B 19/09 175/5 |

(Continued)

FOREIGN PATENT DOCUMENTS

| | | |
|---|---|---|
| WO | 8908941 A1 | 9/1989 |
| WO | 00/76054 A1 | 12/2000 |
| WO | 2005021927 A1 | 3/2005 |

OTHER PUBLICATIONS

Office Action issued in U.S. Appl. No. 12/629,354 mailed Dec. 19, 2011 (11 pages).

(Continued)

*Primary Examiner* — Matthew R Buck
(74) *Attorney, Agent, or Firm* — Adolph Locklar

(57) ABSTRACT

A low inertia permanent magnet motor includes a stator and rotor. The rotor includes a generally tubular and hollow rotor body coupled to the shaft of the motor by one or more spokes and/or webs. The permanent magnets of the rotor are coupled to the rotor body. In some embodiments, the low inertia permanent magnet motor may be used to power a drawworks. In some embodiments, the drawworks may be controlled by an active heave compensation controller.

13 Claims, 5 Drawing Sheets

(56) References Cited

U.S. PATENT DOCUMENTS

| | | | |
|---|---|---|---|
| 4,046,355 A | 9/1977 | Martin | |
| 4,205,379 A | 5/1980 | Fox et al. | |
| 4,226,311 A | 10/1980 | Johnson et al. | |
| 4,242,057 A | 12/1980 | Bender | |
| 4,284,253 A | 8/1981 | Uribe | |
| 4,314,692 A | 2/1982 | Brauer et al. | |
| 4,438,904 A | 3/1984 | White | |
| 4,527,959 A | 7/1985 | Whiteman | |
| 4,545,017 A | 10/1985 | Richardson | |
| 4,545,567 A | 10/1985 | Telford et al. | |
| 4,910,790 A | 3/1990 | Kershaw | |
| 5,146,433 A | 9/1992 | Kosmala et al. | |
| 5,259,731 A | 11/1993 | Dhindsa et al. | |
| 5,306,124 A | 4/1994 | Back | |
| 5,331,238 A | 7/1994 | Johnsen | |
| 5,351,767 A | 10/1994 | Stogner et al. | |
| 5,375,098 A | 12/1994 | Malone et al. | |
| 5,616,009 A | 4/1997 | Birdwell | |
| 5,952,757 A | 9/1999 | Boyd, Jr. | |
| 6,029,951 A | 2/2000 | Guggari | |
| 6,094,024 A | 7/2000 | Westlake | |
| 6,182,945 B1 | 2/2001 | Dyer et al. | |
| 6,419,465 B1 | 7/2002 | Goettel et al. | |
| 6,577,483 B1 | 6/2003 | Steicher et al. | |
| 6,926,259 B1* | 8/2005 | Roodenburg | B66D 3/043 254/277 |
| 6,995,682 B1 | 2/2006 | Chen et al. | |
| 7,231,981 B2* | 6/2007 | Moe | E21B 19/09 166/352 |
| 7,462,138 B2 | 12/2008 | Shetty et al. | |
| 7,549,467 B2 | 6/2009 | McDonald et al. | |
| 7,633,248 B1 | 12/2009 | Williams | |
| 7,737,592 B2 | 6/2010 | Makino et al. | |
| 7,851,962 B1 | 12/2010 | Williams | |
| 7,862,009 B2* | 1/2011 | Folk | B66D 1/12 254/278 |
| 7,923,946 B2* | 4/2011 | Williams | B66B 1/302 318/150 |
| 8,159,103 B2 | 4/2012 | Rodriguez et al. | |
| 8,265,811 B2* | 9/2012 | Kyllingstad | E21B 19/09 166/250.01 |
| 8,368,276 B2 | 2/2013 | Wolf et al. | |
| 2002/0121823 A1 | 9/2002 | Gauthier | |
| 2004/0251766 A1 | 12/2004 | Kometani et al. | |
| 2004/0256110 A1 | 12/2004 | York et al. | |
| 2005/0206266 A1 | 9/2005 | Hans | |
| 2006/0017339 A1 | 1/2006 | Chordia et al. | |
| 2006/0049712 A1 | 3/2006 | Zepp et al. | |
| 2006/0108881 A1 | 5/2006 | Hauger et al. | |
| 2006/0108890 A1 | 5/2006 | Hauger et al. | |
| 2006/0119197 A1 | 6/2006 | Puterbaugh et al. | |
| 2006/0133905 A1 | 6/2006 | Woodruff | |
| 2006/0175064 A1 | 8/2006 | Yuratich | |
| 2006/0181238 A1 | 8/2006 | Choi et al. | |
| 2007/0053780 A1 | 3/2007 | Ruffner et al. | |
| 2007/0114856 A1 | 5/2007 | Park | |
| 2007/0228862 A1 | 10/2007 | Welchko et al. | |
| 2007/0241627 A1 | 10/2007 | Kharsa | |
| 2007/0267222 A1 | 11/2007 | Howard, Jr. et al. | |
| 2008/0061645 A1 | 3/2008 | Yukitake | |
| 2008/0116432 A1 | 5/2008 | Folk et al. | |
| 2008/0181798 A1 | 7/2008 | Folk et al. | |
| 2008/0202042 A1* | 8/2008 | Mesrobian | B66D 1/12 52/120 |
| 2008/0203734 A1 | 8/2008 | Grimes et al. | |
| 2008/0265813 A1 | 10/2008 | Eschleman et al. | |
| 2008/0267785 A1 | 10/2008 | Cervenka et al. | |
| 2009/0267440 A1 | 10/2009 | Kometani et al. | |
| 2011/0295269 A1 | 12/2011 | Swensgard et al. | |
| 2011/0309315 A1* | 12/2011 | Williams | B66D 1/12 254/362 |
| 2013/0029543 A1 | 1/2013 | Gjerpe | |
| 2013/0240808 A1 | 9/2013 | Williams | |

OTHER PUBLICATIONS

Office Action issued in U.S. Appl. No. 12/629,354 mailed Dec. 31, 2012 (11 pages).
Office Action issued in U.S. Appl. No. 12/629,354 mailed Apr. 11, 2012 (11 pages).
Office Action issued in U.S. Appl. No. 12/876,673 mailed Apr. 5, 2013 (12 pages).
Office Action issued in U.S. Appl. No. 12/876,673 mailed Oct. 24, 2012 (14 pages).
Office Action issued in U.S. Appl. No. 12/643,439, mailed Aug. 7, 2012 (21 pages).
Office Action issued in U.S. Appl. No. 12/643,439, mailed Feb. 10, 2012 (20 pages).
Office Action issued in U.S. Appl. No. 13/126,319, mailed Mar. 27, 2013 (5 pages).
Machine translation of WO8908941 publication date Sep. 21, 1989 (2 pages).
International Preliminary Report on Patentability and Written Opinion issued in International Patent Application No. PCT/US2010/060943, mailed Jul. 5, 2012 (8 pages).
For the American Heritage Dictionary definition: connected. (n.d.) The American Heritage Dictionary of the English Language, Fourth Edition. (2003). Retrieved Apr. 29, 2013 from http://www.thefreedictionary.com/connected.
For the American Heritage Dictionary definition: receiving. (n.d.) The American Heritage Dictionary of the English Language, Fourth Edition. (2003). Retrieved Apr. 30, 2013 from http://www.thefreedictionary.com/receiving.
For the American Heritage Dictionary definition: directly. (n.d.) The American Heritage Dictionary of the English Language, Fourth Edition. (2003). Retrieved Apr. 29, 2013 from http://www.thefreedictionary.com/directly.
International Search Report and Written Opinion issued in International Patent Application No. PCT/US2015/020337, dated Jun. 24, 2015 (8 pages).

* cited by examiner

LOW INERTIA DIRECT DRIVE DRAWWORKS

CROSS-REFERENCE TO RELATED APPLICATIONS

This application is a non-provisional application which claims priority from U.S. provisional application No. 61/952,478, filed Mar. 13, 2014, which is incorporated by reference herein in its entirety.

TECHNICAL FIELD/FIELD OF THE DISCLOSURE

The present disclosure relates generally to electric motors, and specifically to AC electric motors having low inertia.

BACKGROUND OF THE DISCLOSURE

Drilling rigs used for offshore drilling generally fall into two categories: gravity based drilling rigs and floating drilling rigs. Free-standing drilling rigs, such as fixed platform or compliant tower drilling platforms, include legs directly anchored to the seabed. Floating rigs, such as spar rigs, semi-submersible rigs, floating production systems, or drillships may be anchored to the seabed by guide cables or the like, but are otherwise free to float by buoyant forces at the surface. As the floating platform moves in response to surface conditions, the drill string or casing being lowered by the platform must be held with relatively good vertical stability with respect to the ocean floor.

In some drilling platforms, a passive heave compensation system may be utilized to prevent the drill string or casing from moving vertically during rig operations. In some embodiments, a passive heave compensation system may include one or more pistons positioned at the travelling block to allow the drill string to move upward or downward relative to the drilling platform as the drilling platform is affected by surface conditions. In other drilling platforms, an active heave compensation system may be utilized. In some such systems, a drawworks may be used to actively raise or lower the drill string in response to movement of the drilling platform.

A drawworks is a common piece of oil field equipment that is used in oil and gas drilling and production. A drawworks is positioned to lift and lower a travelling block in a drilling rig. The travelling block is suspended by a wireline from the derrick of the drilling rig, and is typically used to raise and lower drill string and casing out of and into a wellbore. Often, the travelling block couples to the drill string or casing via a top drive. The top drive is a motor used to rotate the drill string within the wellbore during a drilling operation. In an active heave compensation system, the drawworks must raise and lower the travelling block relative to the level of the drilling platform as the drilling platform moves upward or downward in response to the surface conditions. The drawworks must continuously operate by raising or lowering the travelling block during the entire active heave compensation operation.

Because a typical drawworks generally includes an AC induction motor coupled to the spool of the wireline by a gearbox, a large amount of energy is wasted during active heave compensation in simply causing the drawworks to rotate, stop, and rotate in the other direction due to the large amount of inertia of the rotor of the AC motor and the inherent losses of the gearbox.

SUMMARY

The present disclosure provides for an active heave compensation system for use on a floating drilling platform. The active heave compensation system may include a travelling block, the travelling block coupled to a drill string, the travelling block positioned to be raised or lowered by the extension or retraction of a wireline. The active heave compensation system may also include a drawworks, the drawworks positioned to extend or retract the wireline. The drawworks may include a drum, the drum coupled to the wireline, and positioned to extend or retract the wireline as the drum is rotated; a shaft, the shaft coupled to the drum; and a permanent magnet AC motor. The permanent magnet motor may include a stator, the stator including a plurality of windings, the windings positioned to induce a rotating electromagnetic field into the interior of the stator; and a rotor, the rotor positioned within the stator, the rotor including a generally cylindrical, hollow rotor body and a plurality of permanent magnets, the permanent magnets coupled to the periphery of the rotor body, the rotor body coupled by one or more extensions to the shaft, the rotor positioned to be rotated by the interaction of the rotating electromagnetic field induced by the stator and the permanent magnetic field of the permanent magnets. The active heave compensation system may also include an active heave controller, the active heave controller positioned to control rotation of the drawworks.

The present disclosure also provides for a drawworks for use on a floating drilling platform. The drawworks may include a drum, the drum coupled to a wireline, and positioned to extend or retract a wireline as the drum is rotated; a shaft, the shaft coupled to the drum; and a permanent magnet AC motor. The permanent magnet AC motor may include a stator, the stator including a plurality of windings, the windings positioned to induce a rotating electromagnetic field into the interior of the stator; and a rotor, the rotor positioned within the stator, the rotor including a generally cylindrical, hollow rotor body and a plurality of permanent magnets, the permanent magnets coupled to the periphery of the rotor body, the rotor body coupled by one or more extensions to the shaft, the rotor positioned to be rotated by the interaction of the rotating electromagnetic field induced by the stator and the permanent magnetic field of the permanent magnets.

The present disclosure also provides for a low inertia permanent magnet motor. The low inertia permanent magnet motor may include a shaft; a stator, the stator including a plurality of windings, the windings positioned to induce a rotating electromagnetic field into the interior of the stator; and a rotor, the rotor positioned within the stator, the rotor including a generally cylindrical, hollow rotor body and a plurality of permanent magnets, the permanent magnets coupled to the periphery of the rotor body, the rotor body coupled by one or more extensions to the shaft, the rotor positioned to be rotated by the interaction of the rotating electromagnetic field induced by the stator and the permanent magnetic field of the permanent magnets.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
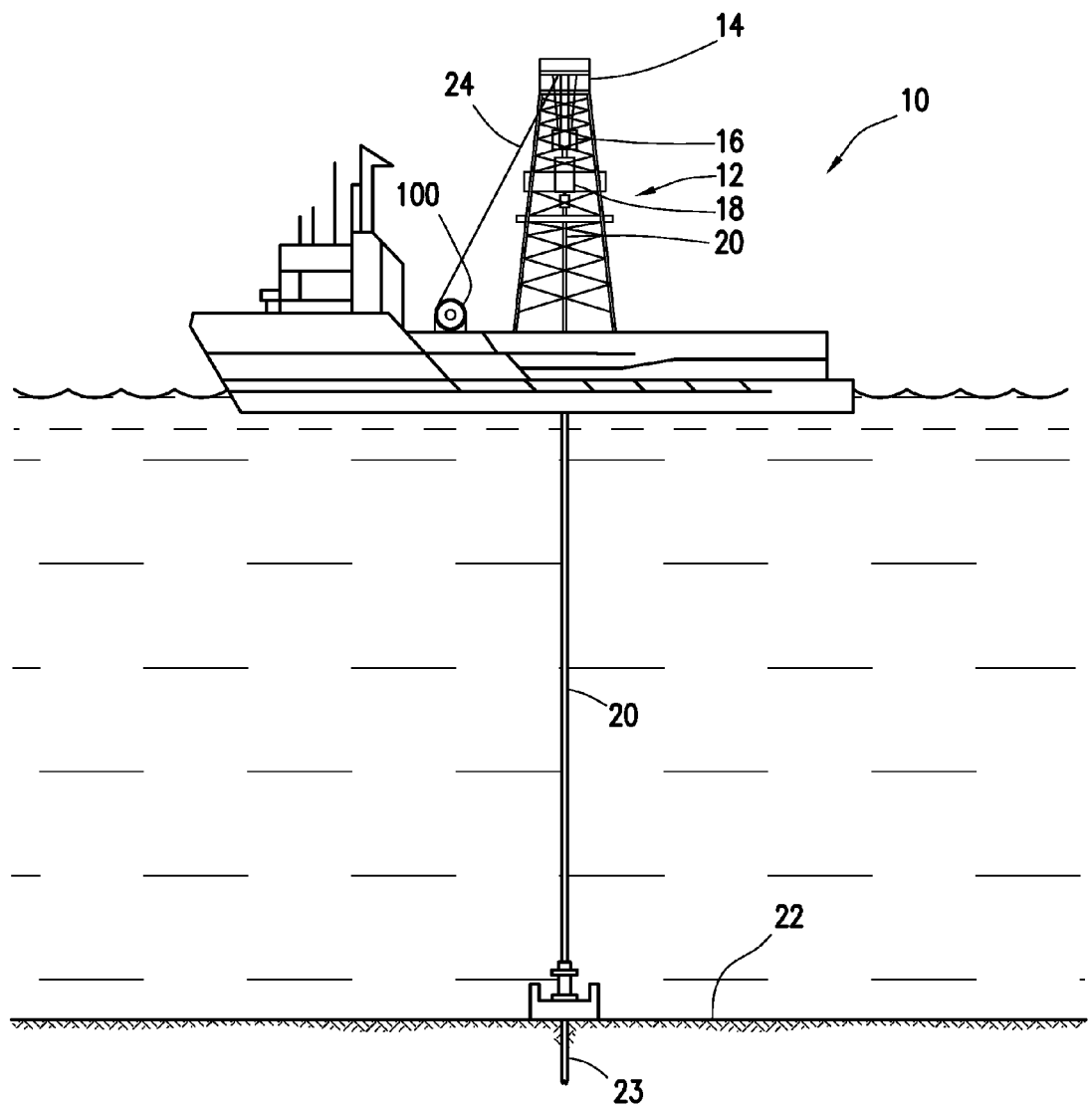
FIG. 1 depicts an offshore drilling platform including a low inertia direct drive drawworks consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts floating drilling platform 10. In this figure, floating drilling platform 10 is a drill ship. One having ordinary skill in the art with the benefit of this disclosure will understand that any floating drilling platform may be substituted for the drill ship depicted. Floating drilling platform 10 may include derrick 12. Derrick 12 may be positioned to support crown block 14. Crown block 14 may be coupled to travelling block 16 by wireline 24. Wireline 24 may be coupled to drawworks 100. As understood in the art, crown block 14 and travelling block 16 may include one or more pulleys positioned to allow wireline 24 to lift or lower travelling block 16 relative to crown block 14 as wireline 24 is paid in or out by drawworks 100. In some embodiments, travelling block 16 may be coupled to top drive 18. Top drive 18 may be used to support a string of interconnected tubular members such as drill string 20 as depicted. Drill string 20 may extend to the seafloor 22 and into wellbore 23 therebelow.

Figure 2:
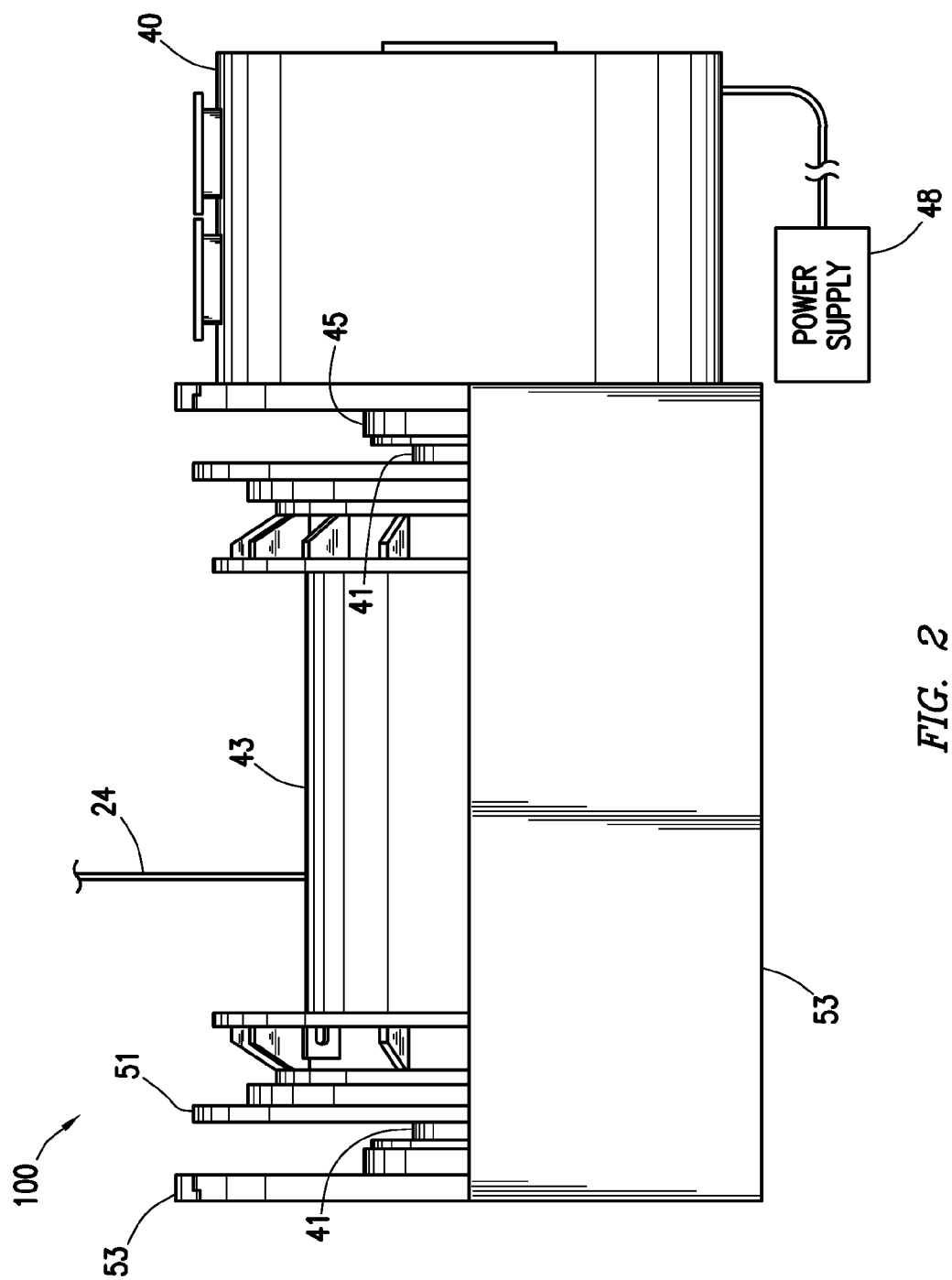
FIG. 2 depicts a side view of a low inertia direct drive drawworks consistent with embodiments of the present disclosure.
Figure 3:
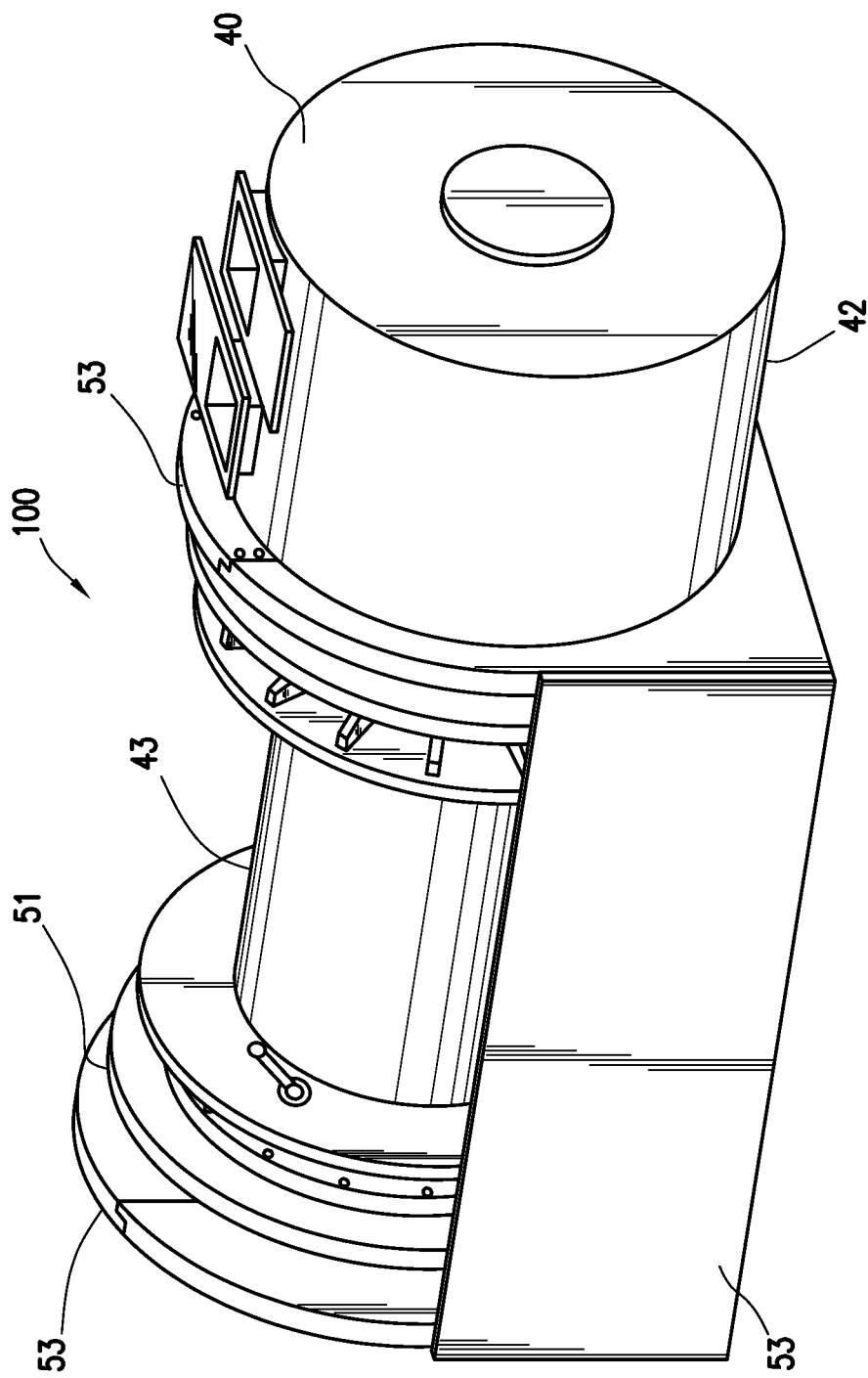
FIG. 3 depicts a perspective view of the low inertia direct drive drawworks of FIG. 2.

As depicted in FIGS. 2, 3 drawworks 100 may include permanent magnet motor 40. Shaft 41 may be connected to permanent magnet motor 40. In some embodiments, bearing housing 45 may be positioned adjacent permanent magnet motor 40 and shaft 41. Shaft 41 may extend through bearing housing 45 and into the interior of motor 40. Drum 43 may be attached to the end of shaft 41 opposite permanent magnet motor 40. Wire line 24 may wrap around drum 43. In some embodiments, drum 43 may be positioned in cradle 53. Cradle 53 may support shaft 41 so as to hold drum 43 and motor 40 above the floor surface. One or more bearings (not shown) may be positioned between cradle 53 and shaft 41. Power supply 48 is connected to permanent magnet motor 40 so as to supply power thereto. Power supply 48 may, in some embodiments, be controlled by an active heave controller as discussed herein below.

Figure 5:
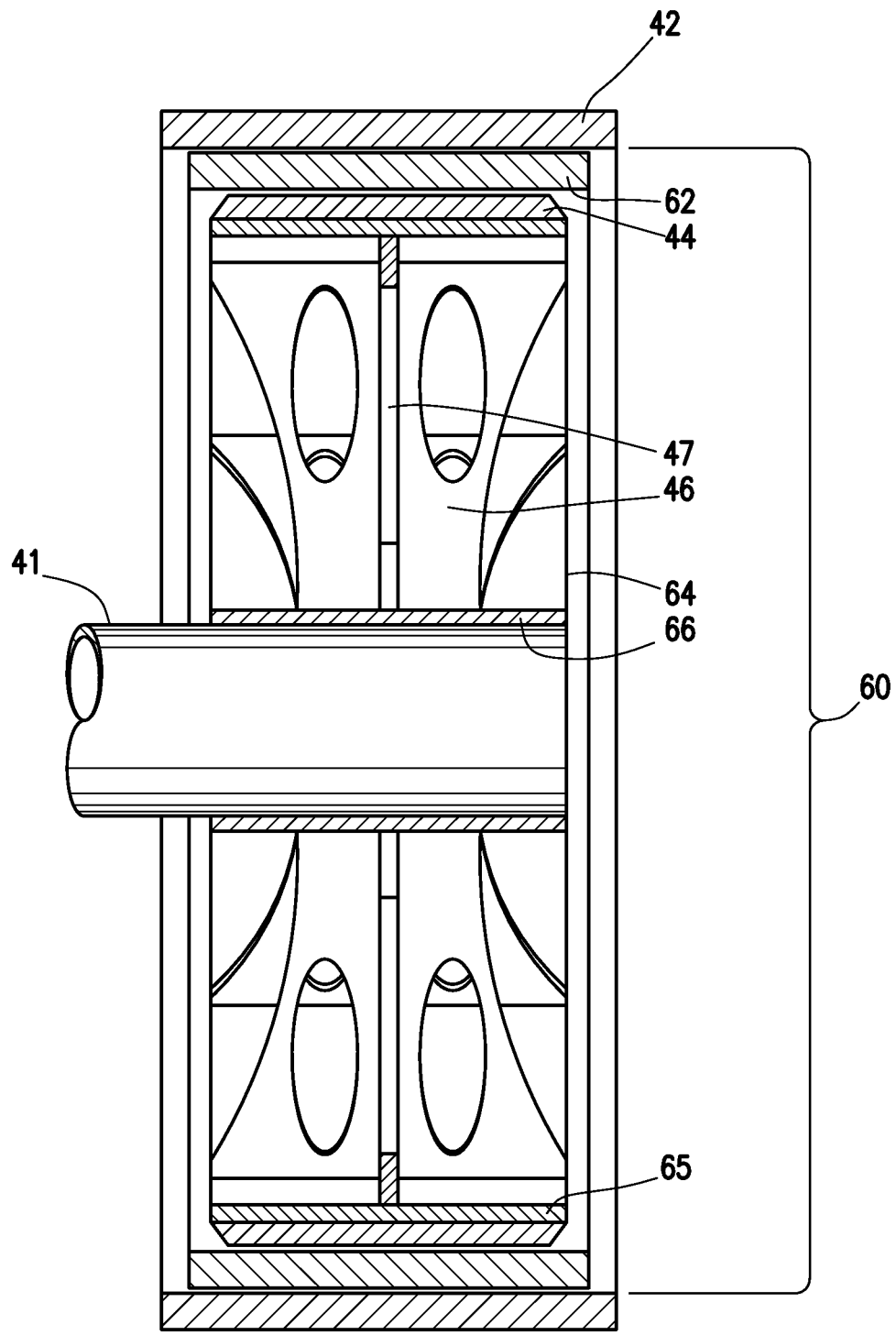
FIG. 5 depicts a cross-section view of a permanent magnet motor for a low inertia direct drive drawworks consistent with embodiments of the present disclosure.

Permanent magnet motor 40 may include housing 42. A rotor and stator are located within housing 42. As depicted in FIG. 5, shaft 41 extends outwardly of interior 60 of housing 42 of permanent magnet motor 40. Stator 62 is affixed to the wall of housing 42. Stator 62 extends around the cylindrical interior of housing 42. Stator 62 includes coils of wire positioned around the inner surface of stator 62. The coils of stator 62 are positioned to, when AC power is supplied thereto, induce a continuously rotating electromagnetic field to interact with the permanent magnet field of the permanent magnets of the rotor of permanent magnet motor 40.

Figure 4:
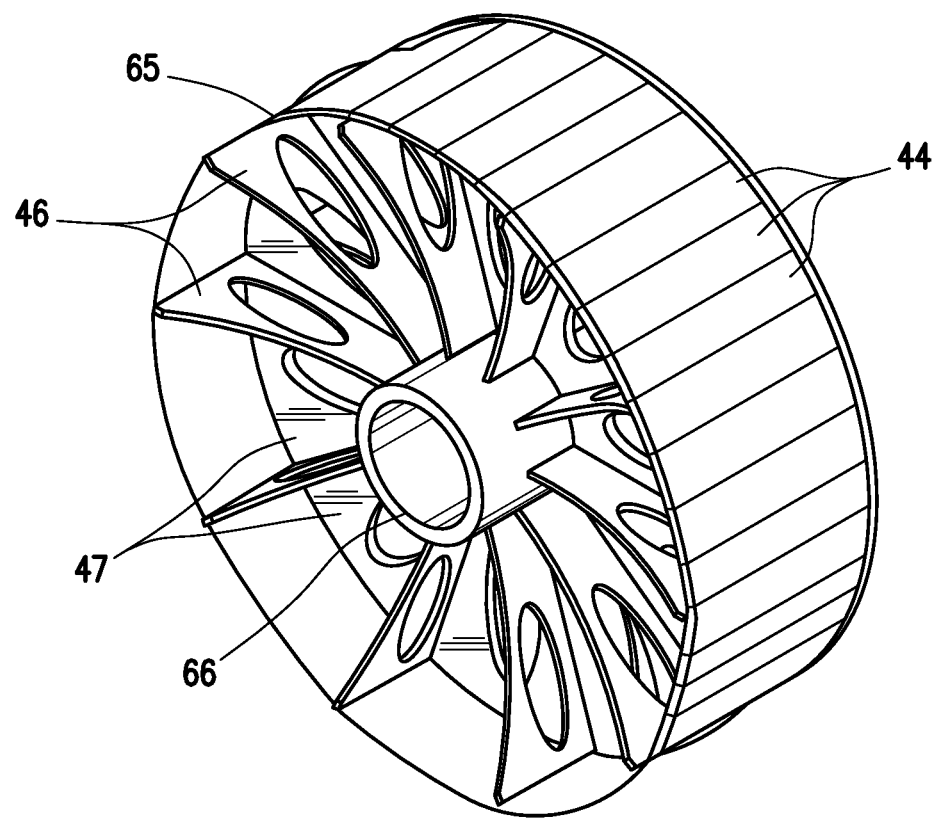
FIG. 4 depicts a perspective view of a rotor of a low inertia direct drive drawworks consistent with embodiments of the present disclosure.

As depicted in FIG. 5, rotor 64 is positioned in close proximity to stator 62. Rotor 64 may include a plurality of permanent magnets 44 formed around a periphery thereof. Rotor 64 may include a generally cylindrical, hollow rotor body 65 to which the permanent magnets are coupled. Rotor body 65 may, in some embodiments, be coupled directly to shaft 41 by, for example and without limitation, one or more extensions. As depicted in FIGS. 4, 5, the extensions may be in the form of one or more of spokes 46 or webs 47. Spokes 46, as understood in the art, may be coupled to and extend radially between shaft 41 and rotor body 65. Webs 47, as understood in the art, may be generally disc-shaped members extending between shaft 41 and rotor body 65. Spokes 46 and webs 47 may include areas having material removed therefrom to, for example, reduce weight. In some embodiments, spokes 46 and webs 47 may be formed from a material having high strength but low density, allowing a minimal amount of weight to be used to form spokes 46 and webs 47. By removing the majority of the interior of rotor 64 and utilizing only spokes 46 or webs 47 to couple rotor 64 to shaft 41, the weight and thus the rotational inertia of rotor 64 may be minimized for the given diameter of rotor 64.

Likewise, in some embodiments, rotor body 65 may be formed from a material having high strength but low density, allowing a minimal amount of weight to form rotor body 65. In some embodiments of the present disclosure, the weight of the peripheral members, i.e. rotor body 65, permanent magnets 44, etc., may constitute between 55-85% of the total weight of rotor 64. In some embodiments, the peripheral members of rotor 64 may constitute about 60% of the total weight of rotor 64. In some embodiments, the peripheral members of rotor 64 may constitute about 70% of the total weight of rotor 64. In some embodiments, the peripheral members of rotor 64 may constitute about 80% of the total weight of rotor 64.

In some embodiments, shaft 41 may be coupled to rotor 64 by the use of a hollow shaft mounting tube 66. In some embodiments, shaft mounting tube 66 may be generally tubular and positioned to have a solid shaft 41 positioned thereinto. In some embodiments, shaft 41 may include a splined outer surface positioned to mate with a splined inner surface of shaft mounting tube 66.

The interaction of the electromagnetic field induced by the coils of stator 62 and the permanent magnets of the rotor 64 provides the rotational power of the permanent magnet motor 40. As rotor 64 is coupled to shaft 41, shaft 41 is likewise rotated. Shaft 41 extends outwardly from interior 60 of housing 42.

In operation, permanent magnet motor 40 rotates shaft 41 which rotates drum 43. The rotation of drum 43 causes wire line 24 to be extended or retracted depending upon the direction of rotation of drum 43. When wire line 24 is retracted, wire line 24 wraps around the outer surface of drum 43. The rotation of drum 43, as caused by permanent magnet 40, may cause wire line 24 to retract (heave in) or extend (pay out) for the purpose of, for example, lifting or lowering a travelling block coupled thereto. The travelling block, as understood in the art, may in turn be coupled to a top drive and/or to a drillstring extending below a drilling platform.

In some embodiments, drawworks 100 may be utilized as part of an active heave compensation system for a floating drilling platform. In such an embodiment, with reference to FIG. 1, as floating drilling platform 10 moves up and down in response to surface conditions such as waves, drawworks 100 may raise or lower travelling block 16 a corresponding amount to maintain the position of drillstring 20 relative to seafloor 22 or wellbore 23. The movement of travelling block 16 by drawworks 100 may be controlled by an active heave controller. The active heave controller may, in some embodiments, utilize one or more of a motion sensor or an accelerometer to detect movement of drilling platform 10 and operate drawworks 100. The active heave controller may, as floating drilling platform 10 moves downward in response to wave action, cause drawworks 100 to rotate in a first direction to lift travelling block 16 in an upward direction at a speed corresponding to the speed at which floating drilling platform 10 is moving downward. This upward movement of travelling block 16 may, for example, prevent drillstring 20 from contacting, for example, the bottom of wellbore 23 or seafloor 22 as floating drilling platform 10 moves downward, closer to seafloor 22 or may maintain a generally constant weight on bit for drillstring 20. As floating drilling platform 10 slows and stops at the bottom of the wave action, the active heave controller likewise slows and stops drawworks 100. As floating drilling platform 10 begins to rise by wave action, the active heave controller may cause drawworks 100 to rotate in the opposite direction and lower travelling block 16 in a downward direction at a speed corresponding to the speed at which floating drilling platform 10 is moving upward. This downward movement of travelling block 16 may, for example, prevent drillstring 20 from moving away from the bottom of wellbore 23 or seafloor 22 as floating drilling platform 10 moves upward, away from seafloor 22 or may maintain a generally constant weight on bit for drillstring 20. Again, as floating drilling platform 10 slows and stops at the top of the wave action, the active heave controller likewise slows and stops drawworks 100.

By continuously operating drawworks 100 to move travelling block 16 upward and downward at a speed equal to and a direction opposite to the upward and downward movement of floating drilling platform 10, the active heave controller may thus maintain the relative position of drillstring 20 and wellbore 23 or seafloor 22 as well as a generally continuous weight on bit for drillstring 20 regardless of the surface wave conditions. Of course, the length of travel between lowermost point and uppermost point of floating drilling platform 10 must be within the travelling length of travelling block 16 for the active heave controller to operate.

Because floating drilling platform 10 must expend energy to rotate, stop, and rotate drawworks 100 in the other direction during active heave compensation, by reducing the weight and thus the inertia of rotor 64, the amount of energy expenditure may be minimized. Additionally, by connecting drum 43 directly to shaft 41, thus eliminating the need for any power transmission equipment between permanent magnet motor 40 and drum 43, the inertial and frictional loss may be further reduced. As understood in the art, any inertial effects of rotor 64 of permanent magnet motor 40 would be amplified by the transmission system.

Additionally, drawworks 100 may be further coupled to an energy storage system. During active heave compensation, the energy expended to lift and lower travelling block 16 by drawworks 100 is generally lost. Thus, the full amount of energy must be utilized to overcome the inertial effects of rotor 64 of permanent magnet motor 40 to lift and lower travelling block 16 on each active heave cycle. By coupling drawworks 100 to an energy storage system, the energy from a lowering cycle may be utilized to assist drawworks 100 to lift travelling block 16 for the next cycle. Because of the weight reduction of rotor 64, the lower inertia of permanent magnet motor 40 may allow, for example, the energy storage system to effectively reduce the amount of energy input needed to sustain the active heave compensation cycle by minimizing the resistance caused by the cyclic rotation, stopping, and rotating the opposite direction of rotor 40. In some embodiment, the energy storage system may include, for example and without limitation, a battery, flywheel, water pump, or heat based fuel cell.

As an example, motor 40 may be operated in a regenerative mode to produce electric power to be stored in a battery when, as floating drilling platform 10 moves upward, the weight of travelling block 16, top drive 18, and drill string 20 are pulled downward by gravity. The stored energy may then be used to at least partly power motor 40 to turn drawworks 100 for the subsequent lifting operation in the next active heave compensation cycle.

As another example, drawworks 100 may be coupled to a rotary water pump positioned to pump water from a first container to a second, higher container when, as floating drilling platform 10 moves upward, the weight of travelling block 16, top drive 18, and drill string 20 are pulled downward by gravity. When water is released back through the pump, the pump may impart a rotation in the opposite direction, thus at least partially powering drawworks 100 for the subsequent lifting operation in the next active heave compensation cycle.

As another example, the operation of an active heave drawworks using a flywheel as an energy storage medium is discussed in U.S. Pat. No. 7,633,248, titled "Flywheel-based energy storage on a heave-compensating drawworks", issued Dec. 15, 2009, the entirety of which is hereby incorporated by reference.

Although described specifically with regard to a drawworks, one having ordinary skill in the art with the benefit of this disclosure will understand that the low inertia permanent magnet electric motor described herein may be utilized for other purposes. For example, the low inertia permanent magnet motor may be used to power, for example and without limitation, a top drive, a rack and pinion hoisting device, a winch, a mud pump, etc.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. An active heave compensation system for use on a floating drilling platform, the active heave compensation system comprising:
  a travelling block, the travelling block coupled to a drill string, the travelling block positioned to be raised or lowered by the extension or retraction of a wireline;
  a drawworks, the drawworks positioned to extend or retract the wireline, the drawworks including:
    a drum, the drum coupled to the wireline, and positioned to extend or retract the wireline as the drum is rotated;
    a shaft, the shaft coupled to the drum;
    a permanent magnet AC motor, the permanent magnet motor including:
      a stator, the stator including a plurality of windings, the windings positioned to induce a rotating electromagnetic field into the interior of the stator; and a rotor, the rotor positioned within the stator, the rotor including a generally cylindrical, hollow rotor body and a plurality of permanent magnets, the permanent magnets coupled to the periphery of the rotor body, the rotor body coupled by one or more extensions of the rotor body directly to the shaft, the rotor positioned to be rotated by the interaction of the rotating electromagnetic field induced by the stator and the permanent magnetic field of the permanent magnets; and an active heave controller, the active heave controller positioned to control rotation of the drawworks.

2. The active heave compensation system of claim 1, wherein the extensions comprise spokes, the spokes being generally linear members extending between and coupled to the shaft and the rotor body.

3. The active heave compensation system of claim 1, wherein the extensions comprise webs, the webs being generally disk-shaped members extending between and coupled to the shaft and the rotor body.

4. The active heave compensation system of claim 3, wherein the webs comprise cutouts formed in each of the webs, the cutouts reducing the weight of the webs.

5. The active heave compensation system of claim 1, wherein the weight of the rotor body and permanent magnets comprise between approximately 60-80% of the total weight of the rotor.

6. The active heave compensation system of claim 1, wherein the active heave controller is positioned to detect upward and downward motion of the floating drilling platform and, in response to the upward or downward motion, cause the drawworks to retract or extend the wireline respectively.

7. The active heave compensation system of claim 5, wherein the active heave controller detects the speed at which the floating drilling platform is moving upward or downward, and causes the drawworks to retract or extend the wireline such that the travelling block moves at a speed equal to and in a direction opposite to that of the floating drilling platform.

8. A drawworks for use on a floating drilling platform, the drawworks comprising:

a drum, the drum coupled to a wireline, and positioned to extend or retract the wireline as the drum is rotated;

a shaft, the shaft coupled to the drum;

a permanent magnet AC motor, the permanent magnet motor including:

a stator, the stator including a plurality of windings, the windings positioned to induce a rotating electromagnetic field into the interior of the stator; and a rotor, the rotor positioned within the stator, the rotor including a generally cylindrical, hollow rotor body and a plurality of permanent magnets, the permanent magnets coupled to the periphery of the rotor body, the rotor body coupled by one or more extensions of the rotor body directly to the shaft, the rotor positioned to be rotated by the interaction of the rotating electromagnetic field induced by the stator and the permanent magnetic field of the permanent magnets.

9. The drawworks of claim 8, wherein the extensions comprise spokes, the spokes being generally linear members extending between and coupled to the shaft and the rotor body.

10. The drawworks of claim 8, wherein the extensions comprise webs, the webs being generally disk-shaped members extending between and coupled to the shaft and the rotor body.

11. The drawworks of claim 10, wherein the webs comprise cutouts formed in each of the webs, the cutouts reducing the weight of the webs.

12. The drawworks of claim 8, wherein the weight of the rotor body and permanent magnets comprise between approximately 60-80% of the total weight of the rotor.

13. The drawworks of claim 8, further comprising an active heave controller positioned to control rotation of the drawworks.

* * * * *